(12) United States Patent
Howarth et al.

(10) Patent No.: US 7,019,922 B2
(45) Date of Patent: Mar. 28, 2006

(54) APPARATUS AND METHOD TO READ INFORMATION FROM A TAPE STORAGE MEDIUM

(75) Inventors: James J. Howarth, Tucson, AZ (US); Robert A. Hutchins, Tucson, AZ (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 10/426,403

(22) Filed: Apr. 29, 2003

(65) Prior Publication Data

US 2004/0218300 A1    Nov. 4, 2004

(51) Int. Cl.
G11B 20/10 (2006.01)
G11B 5/035 (2006.01)

(52) U.S. Cl. .................................... 360/39; 360/65
(58) Field of Classification Search ............... 360/39, 360/51
See application file for complete search history.

(56) References Cited

U.S. PATENT DOCUMENTS

| | | | | |
|---|---|---|---|---|
| 5,321,559 A | 6/1994 | Nguyen et al. | ............... | 360/46 |
| 5,424,881 A | 6/1995 | Behrens et al. | ............... | 360/40 |
| 5,696,639 A | 12/1997 | Spurbeck et al. | ............ | 360/5.1 |
| 5,712,863 A | 1/1998 | Gray | ........................... | 371/52 |
| 5,737,142 A * | 4/1998 | Zook | ............................ | 360/49 |
| 5,771,127 A | 6/1998 | Reed et al. | .................... | 360/51 |
| 5,802,118 A | 9/1998 | Bliss et al. | ................. | 375/350 |
| 5,812,336 A | 9/1998 | Spurbeck et al. | ............. | 360/51 |
| 5,815,514 A | 9/1998 | Gray | ........................... | 371/42 |
| 5,819,309 A | 10/1998 | Gray | ......................... | 711/111 |
| 5,892,632 A | 4/1999 | Behrens et al. | ............... | 360/51 |
| 5,898,534 A | 4/1999 | Gray | ....................... | 360/77.01 |
| 5,909,332 A | 6/1999 | Spurbeck et al. | ............. | 360/51 |
| 5,931,968 A | 8/1999 | Gray | ......................... | 714/806 |
| 5,999,355 A | 12/1999 | Behrens et al. | ............... | 360/65 |
| 6,134,279 A | 10/2000 | Soichi et al. | ............... | 375/341 |
| 6,167,550 A | 12/2000 | Gray | ......................... | 714/769 |
| 6,169,683 B1 | 1/2001 | Farrington | .................. | 363/127 |
| 6,208,481 B1 | 3/2001 | Spurbeck et al. | ............. | 360/65 |
| 6,233,107 B1 * | 5/2001 | Minuhin | ...................... | 360/51 |
| 6,246,733 B1 * | 6/2001 | Hutchins | .................... | 375/355 |
| 6,260,171 B1 | 7/2001 | Gray | ......................... | 714/771 |
| 6,363,512 B1 | 3/2002 | Gray | ......................... | 714/771 |
| 6,396,788 B1 | 5/2002 | Fehy et al. | .............. | 369/59.22 |
| 6,418,101 B1 | 7/2002 | Finkelstein | .............. | 369/47.18 |
| 6,597,526 B1 * | 7/2003 | Gray | ........................... | 360/40 |
| 2002/0021519 A1 * | 2/2002 | Rae | ............................ | 360/51 |

* cited by examiner

Primary Examiner—David Hudspeth
Assistant Examiner—Varsha A. Kapadia
(74) Attorney, Agent, or Firm—Dale F. Regelman

(57) ABSTRACT

A method to read information from a tape storage medium, where that tape includes a calibration region and a data region. The method uses a read channel having a first detection mode and a second detection mode. The method initializes the first detection mode and forms a calibration waveform comprising information read from the calibration region using the first detection mode. The method then defines a plurality of bit cell boundaries, initializes the second detection mode, and reads information from the data region using the second detection mode.

15 Claims, 13 Drawing Sheets

FIG. 2

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

201, 211, 221, 231, 241, 251, 261, 200

APPARATUS AND METHOD TO READ INFORMATION FROM A TAPE STORAGE MEDIUM

FIELD OF THE INVENTION

Applicant's invention relates to an apparatus and method to read information from a tape storage medium.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By "electronic storage media," Applicants mean a device such as a PROM, EPROM, EEPROM, Flash PROM, compactflash, smartmedia, and the like.

One (or more) accessor(s) typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

Tape storage media, i.e. magnetic tape, is subject to variability. Such variability includes, for example, inconsistencies between manufacturers of that media. In addition certain tape media comprises encoded information using, for example, a (0,k) modulation code. Other tape media comprises, for example, encoded information using a (1,7) modulation code. Some tape drives may have to read media with either type of modulation code. In addition, such variability arises from modernization of the media.

In order to minimize the effects of such media variability, what is needed is an apparatus and method to dynamically adjust the read channel architecture used to first calibrate the read channel to identify the phase and frequency of the information encoded on the tape, and to then accurately read that information.

SUMMARY OF THE INVENTION

Applicants' invention comprises a method and apparatus to read information from a tape storage medium. Applicants' apparatus comprises a read channel capable of being configured in a first detection architecture or in a second detection architecture. Applicants' method configures the read channel to comprise the first detection architecture, reads a calibration waveform comprising information read from a calibration region of a tape storage medium using that first detection architecture. Applicants' method then configures the read channel to comprise a second detection architecture and reads information from the data region of the tape using that second detection architecture.

BRIEF DESCRIPTION OF THE DRAWINGS

The invention will be better understood from a reading of the following detailed description taken in conjunction with the drawings in which like reference designators are used to designate like elements, and in which:

FIG. 2 is a block diagram showing the track layout of a magnetic tape head;

DETAILED DESCRIPTION OF THE PREFERRED EMBODIMENTS

Referring to the illustrations, like numerals correspond to like parts depicted in the figures. The invention will be described as embodied in a read channel assembly disposed in a tape drive unit. The following description of Applicant's method to adjust the amplitudes of a plurality of digital signals is not meant, however, to limit Applicant's invention to either reading information from a magnetic tape, or to data processing applications, as the invention herein can be applied to reading information from an information storage medium in general.

Figure 3:
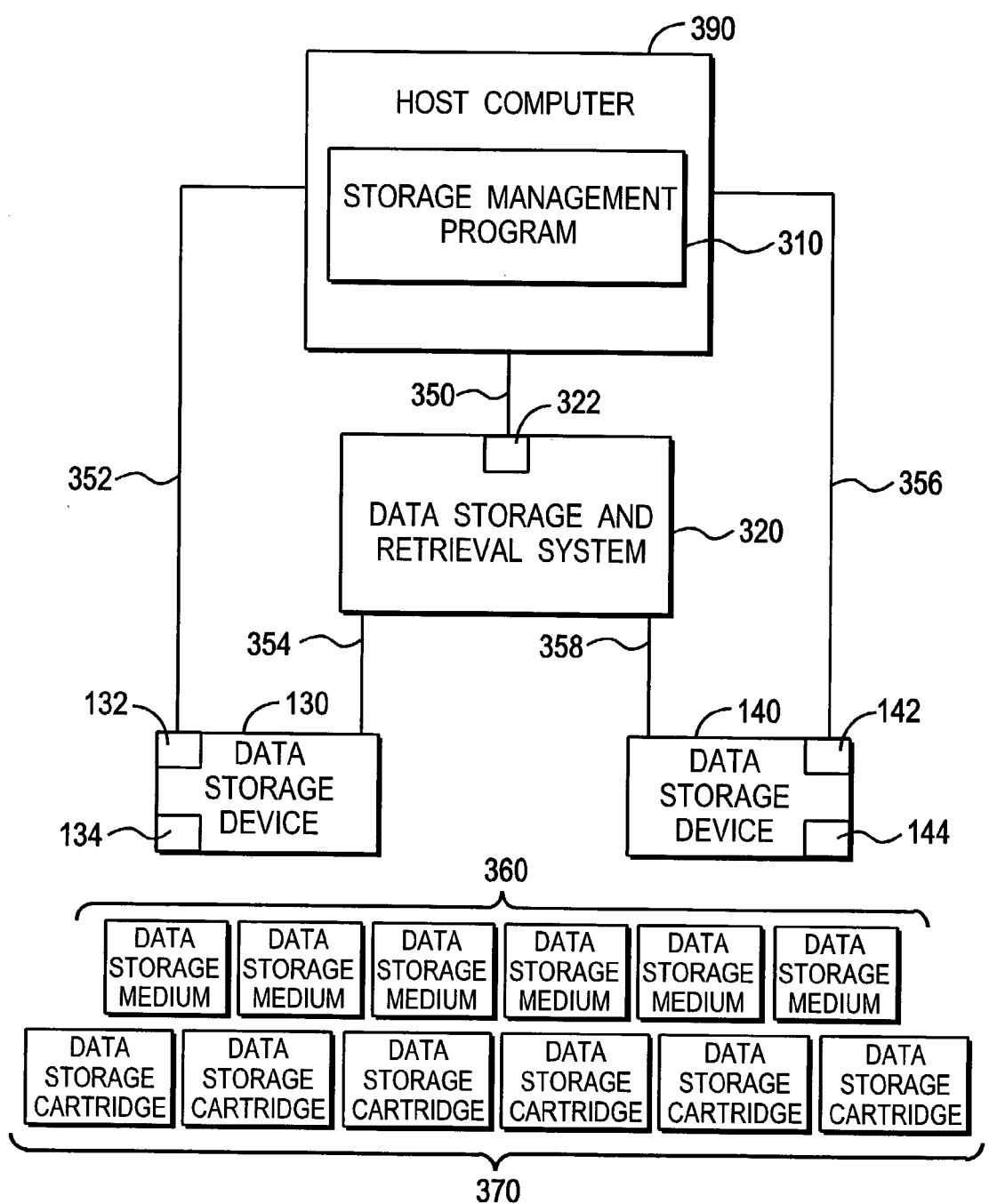
FIG. 3 is a block diagram showing the components of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 352, and 356. Communication links 350, 352, and 356, comprise a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, combinations thereof, and the like.

In the embodiment shown in FIG. 3, data storage and retrieval system 320 includes data storage devices 130 and 140. In alternative embodiments, Applicants' data storage and retrieval system 320 includes a single data storage device. In alternative embodiments, Applicants' data storage and retrieval system 320 includes more than two data storage devices.

A plurality of portable tape storage media 360 are moveably disposed within Applicants' data storage and retrieval system. In certain embodiments, the plurality of tape storage media 360 are housed in a plurality of portable tape cartridges 370. Each of such portable tape cartridges may be removeably disposed in an appropriate data storage device.

Data storage and retrieval system 320 further includes program logic to manage data storage devices 130 and 140, and plurality of portable tape cartridges 370. In certain embodiments, each data storage device includes a controller comprising such program logic. In certain embodiments, a controller, such as controller 160 (FIG. 1) comprises such program logic.

In alternative embodiments, data storage and retrieval system 320 and host computer 390 may be collocated on a single apparatus. In this case, host computer 390 may be connected to another host computer to, for example, translate one set of library commands or protocols to another set of commands/protocols, or to convert library commands from one communication interface to another, or for security, or for other reasons.

Data storage and retrieval system 320 comprises a computer system, and manages, for example, a plurality of tape drives and tape cartridges. In such tape drive embodiments, tape drives 130 and 140 may be any suitable tape drives known in the art, e.g., the TotalStorage™ 3590 tape drives (TotalStorage is a trademark of IBM Corporation). Similarly, tape cartridges 370 may be any suitable tape cartridge device known in the art, such as ECCST, Magstar, TotalStorage™ 3420, 3480, 3490E, 3580, 3590 tape cartridges, etc.

Figure 1:
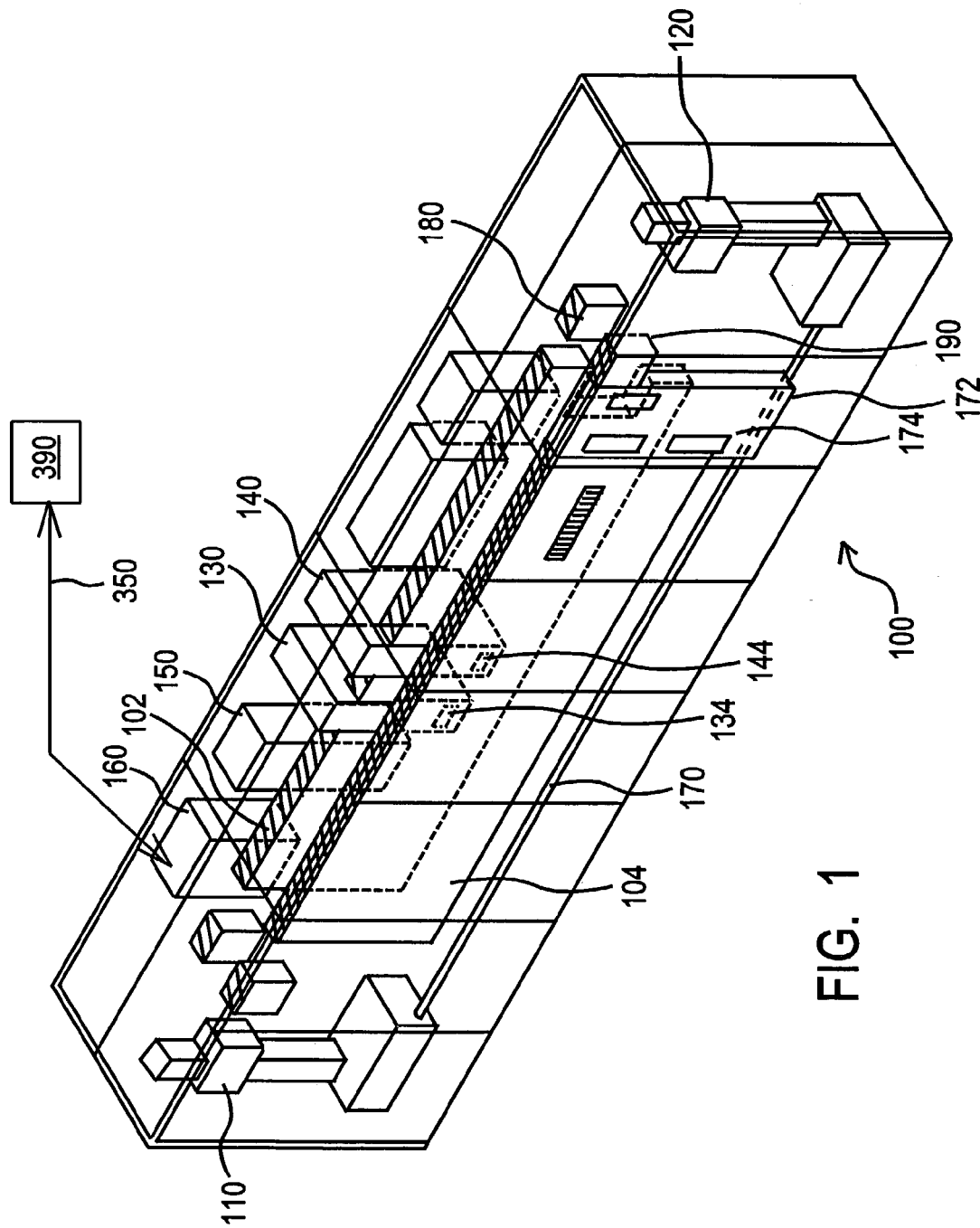
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicants' automated data storage and retrieval system includes one or more accessors, such as accessors 110 and 120. As shown in FIG. 1, accessors 110 and 120 travel bi-directionally along rail 170 in an aisle disposed between first wall of storage slots 102 and second wall of storage slots 104. An accessor is a robotic device which accesses portable data storage media from first storage wall 102 or second storage wall 104, transports that accessed media to data storage devices 130/140 for reading and/or writing data thereon, and returns the media to a proper storage slot. Data storage device 130 includes data storage device controller 134. Data storage device 140 includes data storage device controller 144.

Device 160 comprises a library controller. In certain embodiments, library controller 160 is integral with a computer. Operator input station 150 permits a user to communicate with Applicants' automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

In the embodiments wherein data storage drive 130 and/or 140 comprises a tape drive unit, that tape drive unit includes, inter alia, a tape head. Referring now to FIG. 2, multi-element tape head 200 includes a plurality of read/write elements to record and read information onto and from a magnetic tape. In certain embodiments, magnetic tape head 200 comprises a thin-film magneto-resistive transducer. In an illustrative embodiment, tape head 200 may be constructed as shown in FIG. 2. The length of the tape head 200 substantially corresponds to the width of a magnetic tape. In certain embodiments tape head 200 includes thirty-two read/write element pairs (labeled "RD" and "WR") and three sets of servo read elements, corresponding to the three servo areas written to the magnetic tape. In the illustrated embodiment, the thirty-two read/write element pairs are divided into groups of eight, i.e. groups 201, 221, 241, and 261.

Tape head 200 further includes a plurality of servo sensors to detect servo signals comprising prerecorded linear servo edges on the magnetic tape. In the embodiment of FIG. 2, adjacent groups of 8 read/write pairs are separated by two tracks occupied by a group of four servo sensors. Each group of four servo sensors may be referred to as a "servo group", e.g. servo group 211, servo group 231, and servo group 251.

In the illustrated embodiment, tape head 200 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

Figure 4:
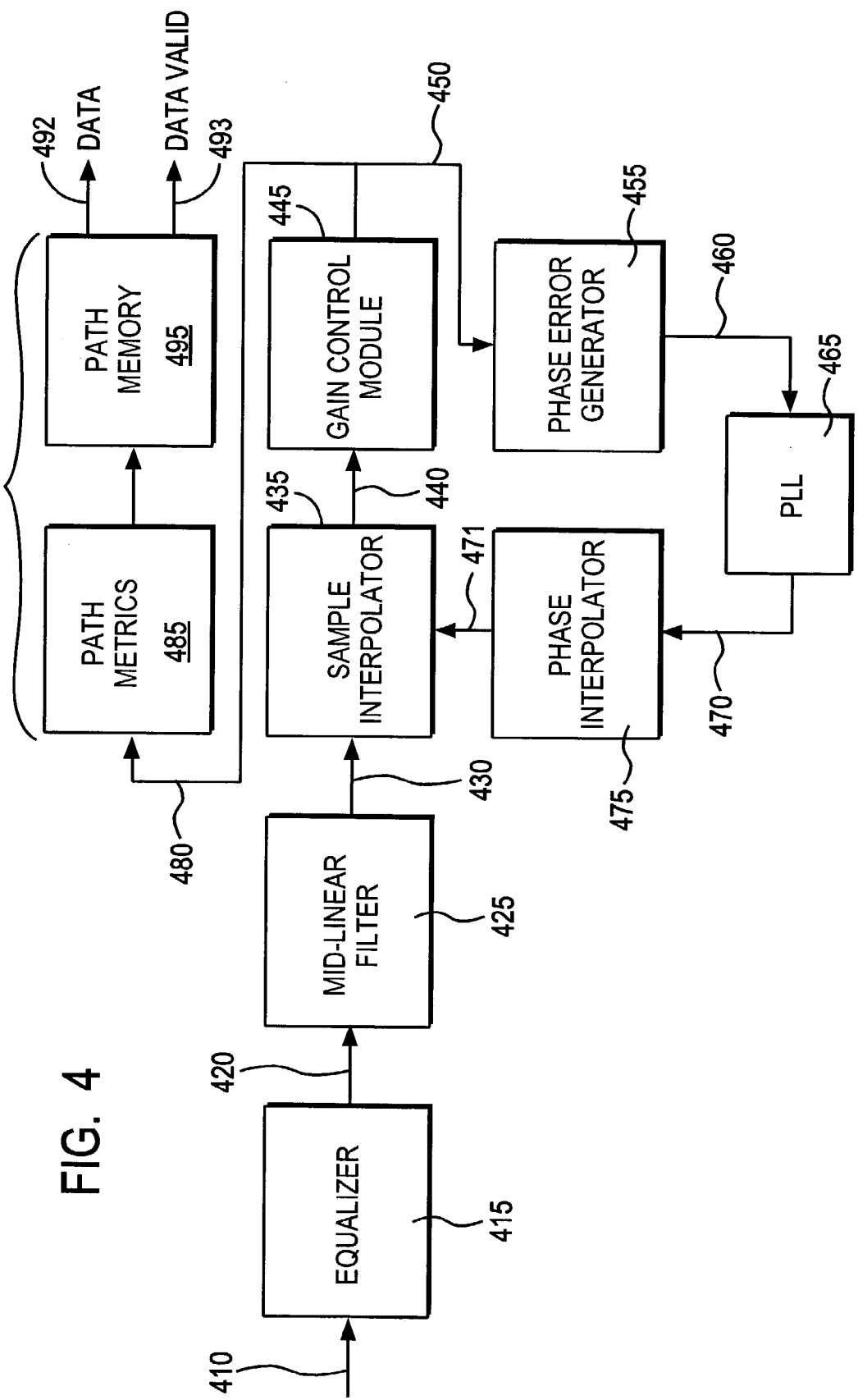
FIG. 4 is a block diagram showing the architecture of Applicants' read channel assembly when used in a tracking mode.

FIG. 4 shows the architecture and data flow of Applicants' asynchronous read detect channel assembly when used in a tracking mode. In certain embodiments, FIG. 4 comprises an asynchronous read detect channel using a partial response maximum likelihood ("PRML") mode. In the illustrated embodiment of FIG. 4, Applicants' asynchronous read detect channel assembly includes equalizer 415, mid-linear filter 425, sample interpolator 435, gain control module 445, phase-error generator 455, PLL circuit 465, phase interpolator 475, path metrics module 485, and path memory 495. In certain embodiments, path metrics module 485 in combination with path memory 495 comprises an assembly known as a maximum likelihood detector, such as maximum likelihood detector 490.

When reading information from a magnetic tape using a read head, such as read/write head 200, a waveform comprising that information is formed. A first waveform is provided to equalizer 415 using communication link 410. In certain embodiments, equalizer 415 comprises a finite impulse response ("FIR") filter. Such a FIR filter shapes the first waveform to produce a second signal.

The second signal formed in equalizer 415 is provided to mid-linear filter 425 using communication link 420. Mid-linear filter 425 determines the value of the equalized signal at the middle of the sample cell. Mid-linear filter 425 produces a third signal which includes the equalized signal and the value of the equalized signal at the middle of the sample cell.

The third signal formed in mid-linear filter 425 is provided to sample interpolator 435 via communication link 430. Sample interpolator 435 receives the third signal from mid-linear filter 425 and using the output of PLL circuit 465 estimates the equalized signal at the synchronous sample time. By synchronous sample time, Applicants mean the time when the bit cell clock arrives. PLL circuit 465 provides this time. Sample interpolator 435 provides one or more fourth, synchronous signals.

The one or more fourth digital, synchronous signals formed by sample interpolator 435 are provided to gain control module 445 via communication link 440. Gain control module 445 adjusts the amplitude of the one or more fourth signals to form one or more fifth signals having amplitudes set to preset levels required by the maximum likelihood detector 490. In the illustrated embodiment, the maximum likelihood detector 490 comprises path metrics module 485 and path memory 495. The one or more fifth signals are provided to maximum likelihood detector 490 via communication link 480. The output of the maximum likelihood detector is data on communication link 492 and a data valid signal on communication link 493.

The tracking mode of FIG. 4, includes a feedback loop comprising phase error generator 455, PLL circuit 465, and phase interpolator 475. The one or more fifth signals formed by gain control circuit 445 are provided to phase-error generator 455 via communication link 450. Phase-error generator 455 estimates the phase of the one or more fifth signals and generates an error signal that is provided to PLL circuit 465 via communication link 460.

The phase-error is processed by PLL circuit 465 which filters the phase-error and determines the locations of the synchronous bit cell boundaries. The locations of the synchronous bit cell boundaries are provided to phase interpolator 475 and sample interpolator 435 via communication links 470 and 471, respectively.

Figure 5:
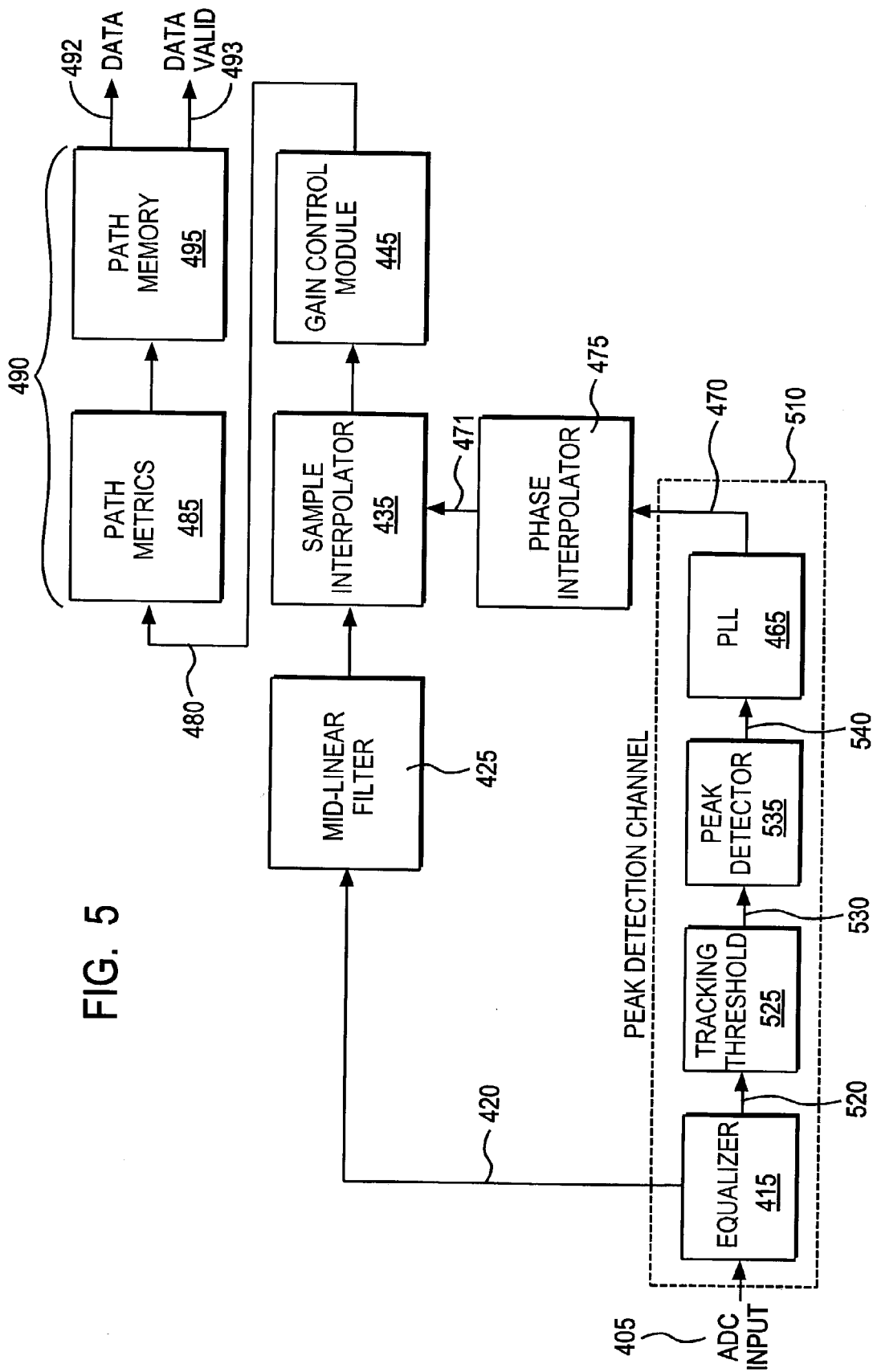
FIG. 5 is a block diagram showing the architecture of Applicants' read channel assembly when used in a peak detection or acquisition mode.

FIG. 5 shows the architecture and data flow of Applicants' asynchronous read detect channel assembly when used in a "peak detection" or acquisition mode. In the illustrated embodiment of FIG. 5, Applicants' read channel includes peak detection channel 510 comprising equalizer 415, tracking threshold module 525, peak detector 535, and PLL circuit 465. Equalizer 415 provides the second signal to tracking threshold module 525 via communication link 520, and to mid-linear filter 425 (FIG. 4) via communication link 420 (FIGS. 4, 5). Tracking threshold module 525 derives a positive and negative threshold level where those threshold levels comprise some fraction of the average peak level. The tracking threshold module 525 provides these thresholds to the peak detector 535 along with the equalized signal from the equalizer 415 via communication link 530.

Peak detector 535 determines the locations of the "1"s in the data stream. A "1" occurs if there is a peak and the peak amplitude, either positive or negative, is greater than a positive threshold, or less than a negative threshold, provided by the tracking threshold module 525. Peak detector 535 provides a signal representing the location of the peak and a peak-detected qualifier to the PLL circuit 465 via communication link 540. PLL circuit 465 is interconnected with phase interpolator 475 (FIG. 4) as described above.

In the peak detection or acquisition mode shown in FIG. 5, Applicants' asynchronous read channel does not include a feedback loop from the gain control module 445 (FIGS. 4, 5) to the phase-error generator 455, PLL circuit 465, phase interpolator 475, and sample interpolator 435. This architecture allows a fast acquisition mode, i.e. peak detection mode, wherein the PLL circuit is rapidly "locked," and the gain adjusted. By "locking" the PLL circuit, Applicants mean locking onto the phase and frequency of the waveform comprising the information read from one or more tape channels, and then defining the bit cell boundaries separating individual data bits.

Figure 7:
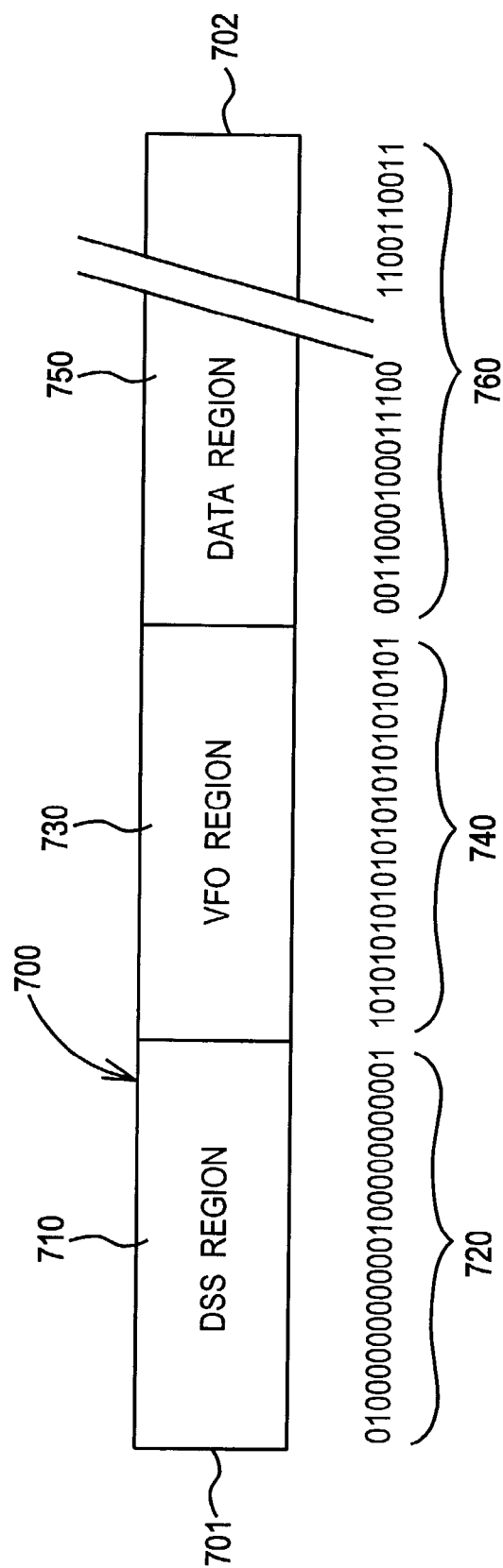
FIG. 7 is a block diagram showing typical formatting used in magnetic tape storage media.

FIG. 7 shows a typical tape formatting used in magnetic tapes. Referring now to FIG. 7, magnetic tape 700 includes first end 701 and second end 702. Disposed between first end 701 and second end 702 are, among other regions, a DSS region 710, a VFO region 730, and a data region 750.

Pattern 720 is typically encoded in the DSS region. DSS region 720 is a calibration field with a low frequency of "1"s. Generally, user data is not encoded in DSS region 710. Pattern 740 is typically encoded in the VFO region. VFO region 740 is a calibration field comprising a pattern of alternating "1"s and "0"s. Generally, user data is not encoded in VFO region 730. Data region 750 includes the user data 760 encoded on the tape medium.

Figure 6A:
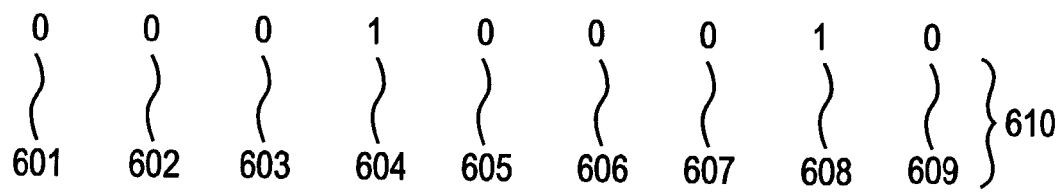
FIG. 6A information encoded on a tape storage medium.
Figure 6B:
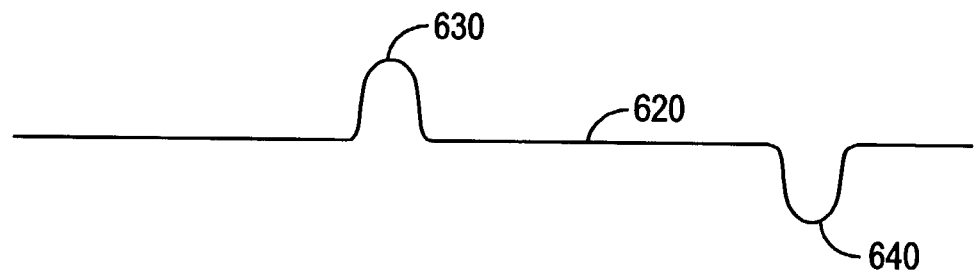
FIG. 6B shows an analog waveform comprising the information of FIG. 6A.
Figure 6C:
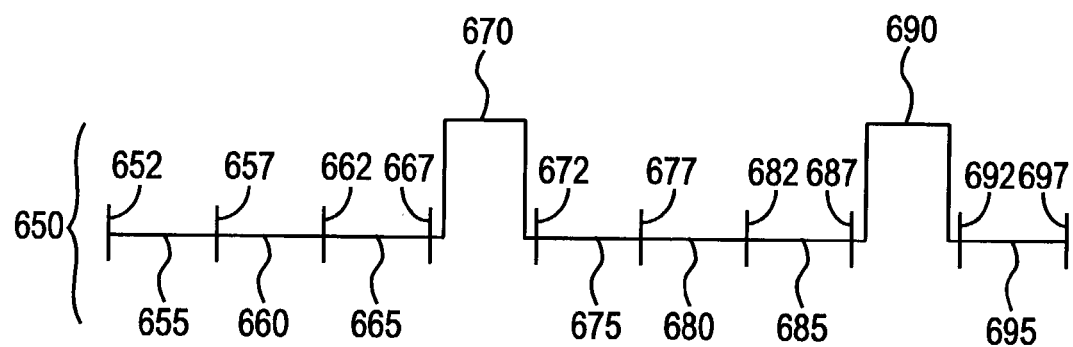
FIG. 6C shows a digital waveform comprising the information of FIG. 6A.

Referring now to FIG. 6A, information 610 comprises data 601, 602, 603, 604, 605, 606, 607, 608, and 609, having the values shown in FIG. 6A. Referring now to FIG. 6B, waveform 620 comprises an analog waveform produced by reading information 610 from a data storage medium, for example reading information 610 from tape region 750 (FIG. 7) using tape head 200 (FIG. 2). Applicants' apparatus and method converts the analog waveform 620 into digital waveform 650 comprising signals 655, 660, 665, 670, 675, 680, 685, 690, and 695, where each of those signals is defined by a pair of bit cell boundaries, i.e. bit cell boundaries 652, 657, 662, 667, 672, 677, 682, 687, 692, and 697. For example, signal 655 is defined by bit cell boundaries 652 and 657.

As the storage density of information storage media has increased, i.e. as the intervals between individual datapoints on that media has decreased, it has become increasingly difficult to differentiate valid signals from noise. In addition, reading information from a magnetic tape differs from reading information from other information storage medium, i.e. such as a hard disk drive. A tape storage medium comprises a multi-track environment while a hard disk is a single track environment. In addition, a hard disk comprises a rigid information storage medium operated in a highly controlled, often purified environment. In contrast, tape drives read information from a flexible medium in a nearly uncontrolled environment.

A hard disk unit generally uses a single storage medium. In contrast, a tape drive must read information from many, interchangeable tape storage media. In addition, tape drives must support what are sometimes called "legacy formats," i.e. formats one or more generations backward in time. Applicants' apparatus and method can detect, using the PRML mode shown in FIG. 4, data written using a (0,k) modulation code. In addition, Applicants apparatus and method can detect, using the peak detection mode shown in FIG. 5, data written with a (1,7) modulation code. As a general matter, a modulation code (x,y) specifies that signal transitions are separated by at least X+1 synchronous clock periods and by at the most Y+1 synchronous clock periods.

Figure 13:
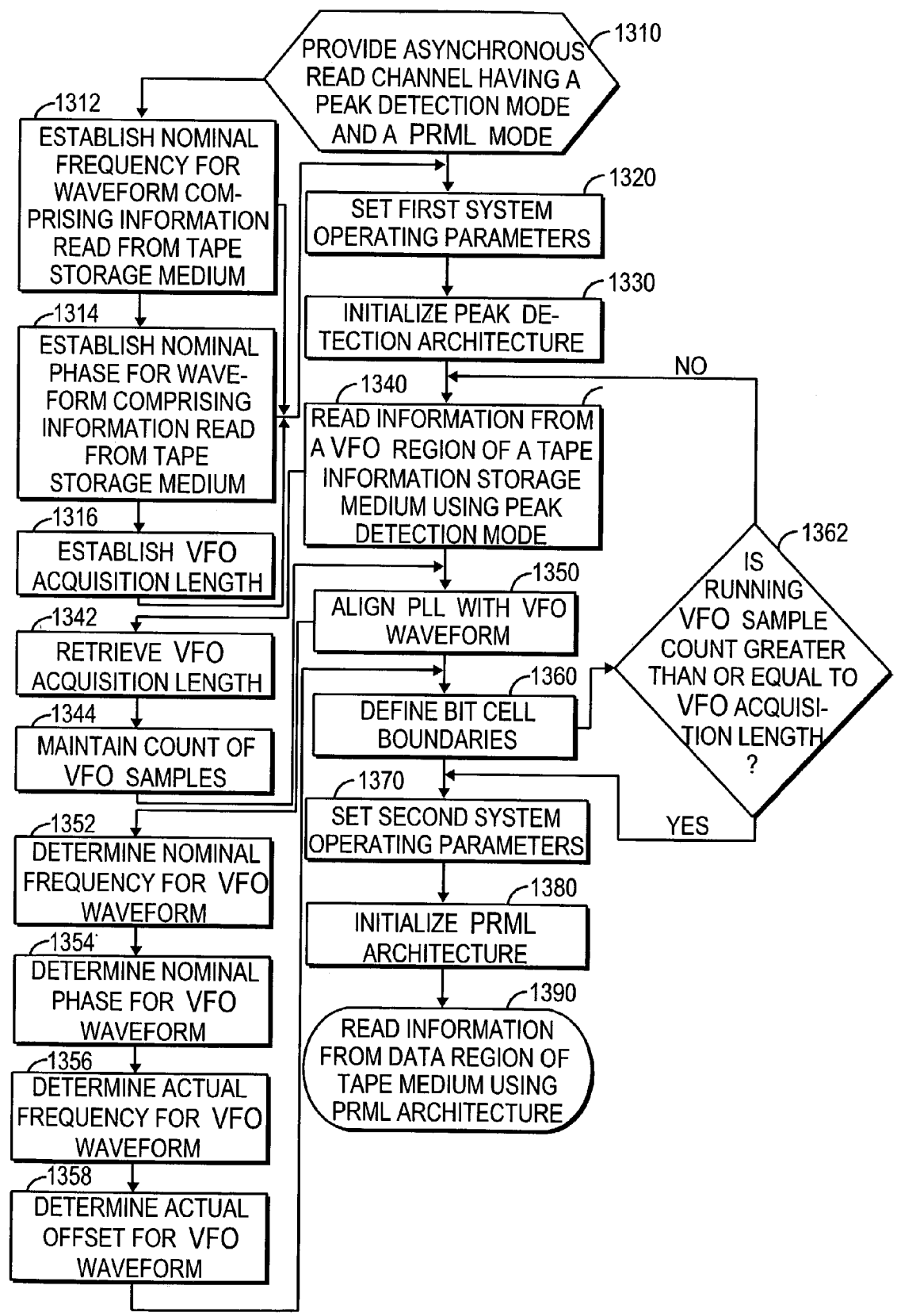
FIG. 13 is a flow chart summarizing the steps in Applicants' method to read information from a tape storage medium using Applicants' apparatus.

FIG. 13 summarizes the steps of Applicants' method to read information from a tape storage medium using a read channel having a peak detection or acquisition mode and a tracking mode. Referring now to FIG. 13, in step 1310 Applicants' method provides an asynchronous read detection channel having a peak detection mode for signal acquisition and a PRML mode for data detection and tracking. In certain embodiments, step 1310 includes providing a read channel that can be dynamically configured to comprise the architecture shown in FIG. 4, and that can be dynamically configured to comprise the architecture shown in FIG. 5. In certain embodiments, Applicants' method transitions from step 1310 to step 1320.

In certain embodiments, Applicants' method includes step 1312 wherein Applicants' method establishes one or more nominal frequencies for waveforms comprising information read from one or more portions of a tape storage medium. In certain embodiments, this nominal frequency is set in firmware disposed in Applicants' tape drive unit, such a tape drive unit 130 (FIG. 1)/140 (FIG. 1). In certain embodiments, this nominal frequency is set in firmware disposed in Applicants' tape drive controller, such a tape drive controller 134 (FIG. 1)/144 (FIG. 1). In certain embodiments, this nominal frequency is set in firmware disposed in Applicants' data storage and retrieval system, such as system 100 (FIG. 1). In certain embodiments, this nominal frequency is set in firmware disposed a system controller, such as controller 160 (FIG. 1). In certain embodiments, this nominal frequency is entered using operator input station 150 (FIG. 1).

In certain embodiments, Applicants' method includes step 1314 wherein Applicants' method establishes one or more nominal phase values for waveforms comprising information read from one or more portions of a tape storage medium. In certain embodiments, this nominal phase value is set in firmware disposed in Applicants' tape drive unit, such a tape drive unit 130/140. In certain embodiments, this nominal phase value is set in firmware disposed in Applicants' tape drive controller, such a tape drive controller 134 (FIG. 1)/144 (FIG. 1). In certain embodiments, this nominal phase value is set in firmware disposed in Applicants' data storage and retrieval system, such as system 100. In certain embodiments, this nominal phase value is set in firmware disposed in a system controller, such as controller 160 (FIG. 1). In certain embodiments, this nominal phase value is entered using operator input station 150 (FIG. 1).

In certain embodiments, Applicants' method includes step 1316 wherein Applicants' method establishes a VFO acquisition length. This VFO acquisition length determines the time period the read channel is configured in the acquisition mode. In certain embodiments, the VFO acquisition length is set in firmware disposed in Applicants' data storage device, such as data storage device 130/140. In certain embodiments, this VFO acquisition length is set in firmware disposed in Applicants' tape drive controller, such a tape drive controller 134 (FIG. 1)/144 (FIG. 1). In certain embodiments, the VFO acquisition length is set in program logic disposed in Applicants' data storage device, such as data storage device 130/140. In certain embodiments, the VFO acquisition length is set in program logic disposed in Applicants' data storage and retrieval system, such as data storage and retrieval system 100 (FIG. 1). In certain embodiments, the VFO acquisition length is set in program logic disposed in a controller, such as controller 160 (FIG. 1) disposed in Applicants' data storage and retrieval system, such as data storage and retrieval system 100.

In step 1320 Applicants' method sets first operating parameters. These first operating parameters include, for example, a first gain level for gain module 445, a first PLL gain level, one or more error flags, and the like. In certain embodiments, step 1320 is performed by a data storage device controller, such as a controller disposed in data storage device 130/140. In certain embodiments, step 1320 is performed by a controller, such as controller 160 (FIG. 1) disposed in Applicants' data storage and retrieval system, such as system 100 (FIG. 1).

Applicants' method transitions from step 1320 to step 1330 wherein Applicants' method initializes the asynchronous read detect channel in a peak detection architecture. In certain embodiments, step 1330 includes configuring Applicants' asynchronous read detect channel to comprise the architecture shown in FIG. 5.

Applicants' method transitions from step 1330 to step 1340 wherein Applicants' reads information from a VFO region, such as VFO region 730 (FIG. 7), of a tape storage medium, such as tape 700 (FIG. 7). In certain embodiments, step 1340 includes using a peak detection read channel.

In certain embodiments, Applicants' method includes step 1342 wherein Applicants' method retrieves a VFO acquisition length. In embodiments which include step 1342, Applicants' method transitions from step 1342 to step 1344 wherein Applicants' method maintains a running count of the VFO samples.

Figure 9:
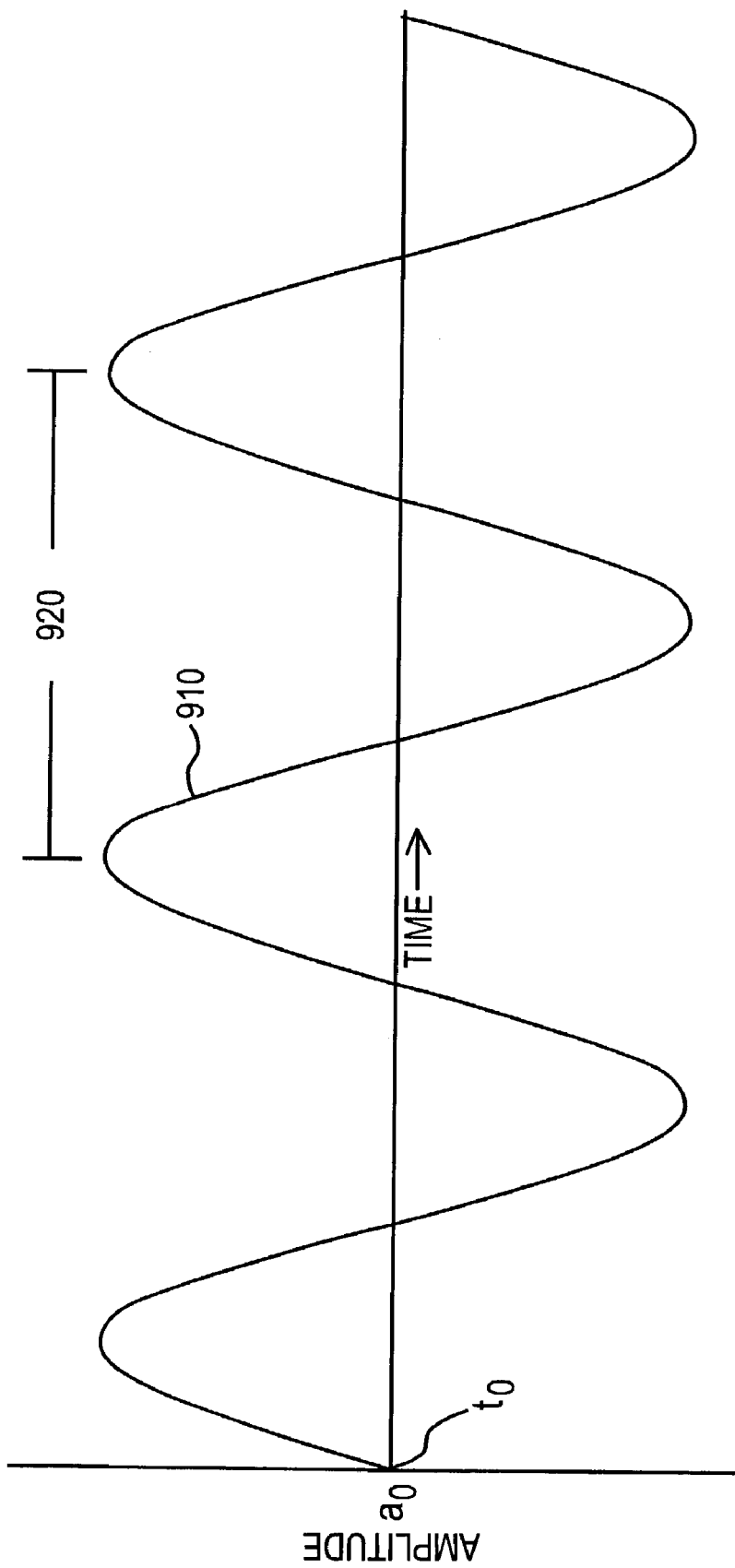
FIG. 9 shows a nominal VFO waveform.

Referring to FIG. 9, VFO waveform 910 comprises information, such as information 740 (FIG. 7), read from a VFO region of a tape storage medium. Waveform 910 has a frequency 920 and an amplitude $a_0$ at time $t_0$. Applicants' method transitions from step 1340 to step 1350 wherein Applicants' method aligns a PLL circuit, such as PLL circuit 465 (FIGS. 4, 5) with the VFO waveform being read.

In certain embodiments, Applicants' method includes step 1352 wherein Applicants' method determines a nominal frequency for the VFO waveform. In certain embodiments, step 1352 includes retrieving a previously set nominal frequency. In certain embodiments, step 1352 includes retrieving a nominal frequency established in step 1312.

In certain embodiments, Applicants' method includes step 1354 wherein Applicants' method determines a nominal phase for the VFO waveform. In certain embodiments, step 1354 includes retrieving a previously set nominal phase. In certain embodiments, step 1354 includes retrieving a nominal phase established in step 1314.

Figure 11:
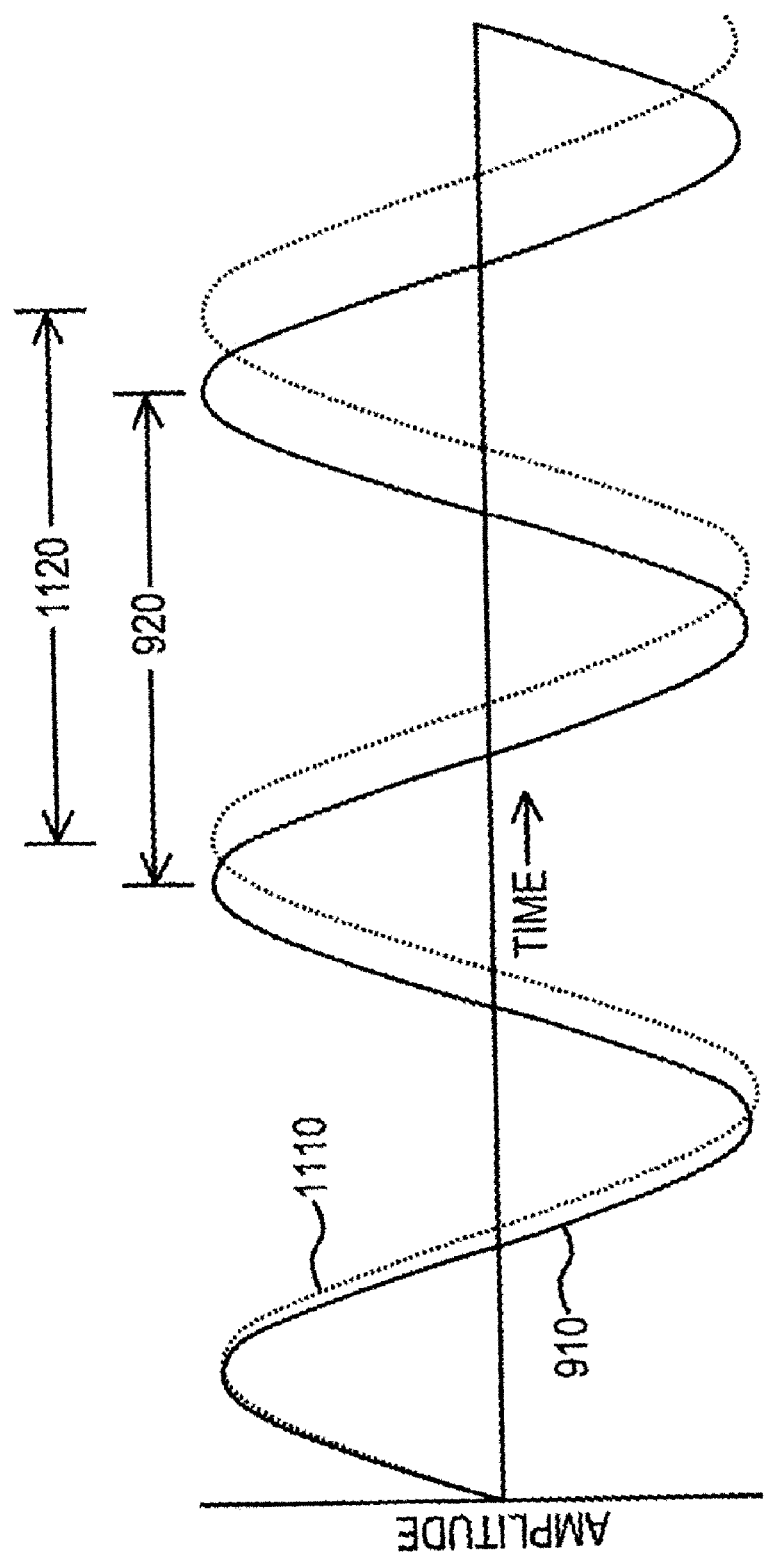
FIG. 11 shows the nominal VFO waveform of FIG. 9 and an actual VFO waveform, where those waveforms have differing frequencies.

In certain embodiments, Applicants' method includes step 1356 wherein Applicants' method determines the actual frequency for the VFO waveform. For example and referring to FIG. 11, waveform 910 comprises a nominal VFO waveform having nominal frequency 920 and waveform 1110 comprises an actual VFO waveform having a frequency 1120.

In certain embodiments, Applicants' apparatus and method is capable of aligning PLL circuit 465 with an actual frequency of a VFO waveform, such as frequency 1120, where that actual frequency differs from the nominal frequency, such as frequency 920, by about plus or minus twenty-five percent (25%) or less.

Figure 10:
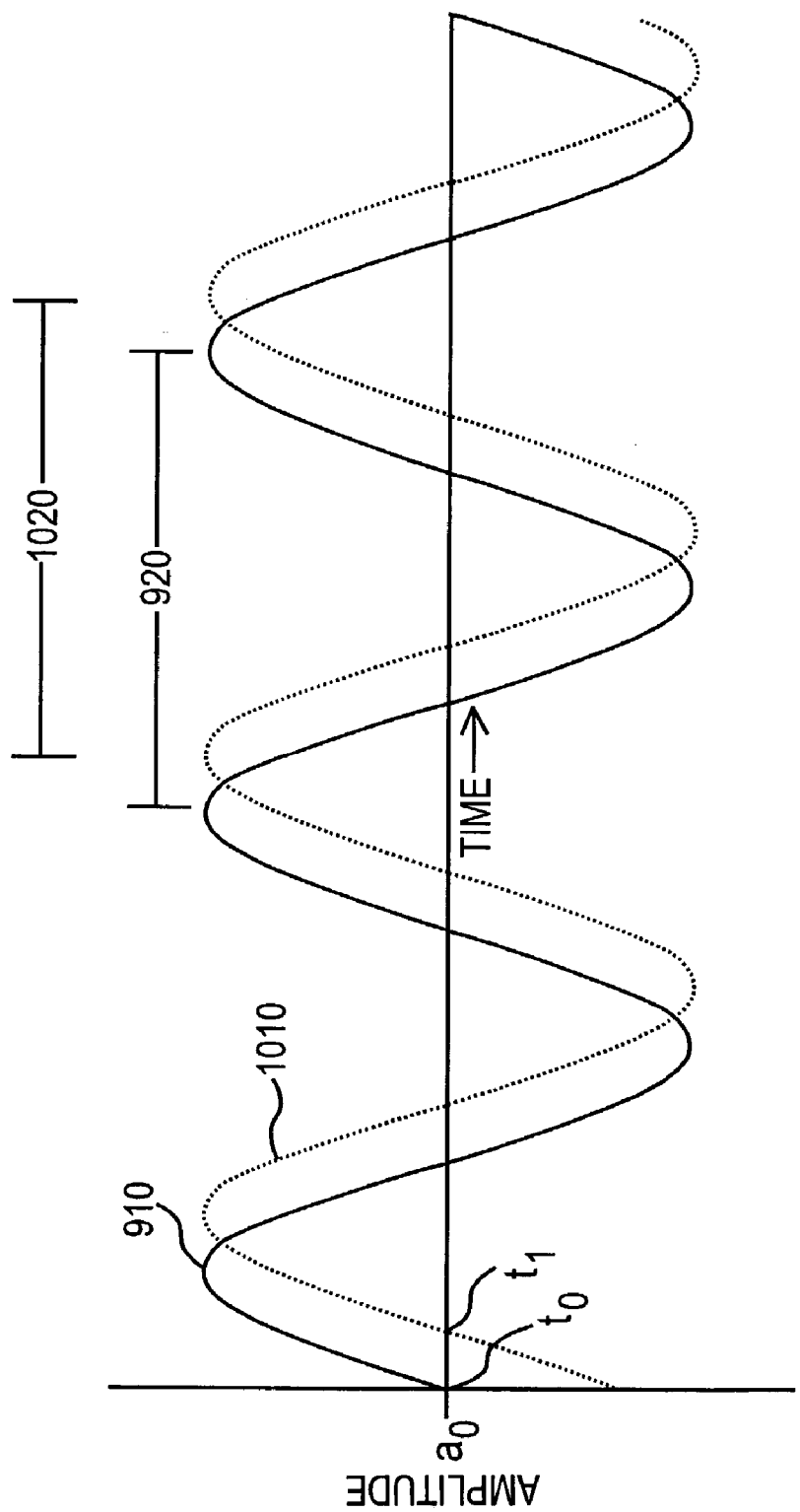
FIG. 10 shows the nominal VFO waveform of FIG. 9 and an actual VFO waveform, where those waveforms have differing phases.

In certain embodiments, Applicants' method includes step 1358 wherein Applicants' method determines the actual phase for the VFO waveform. For example and referring to FIG. 10, waveform 920 comprises a nominal VFO waveform having an a frequency 920 and amplitude $a_0$ at time to, i.e. a nominal phase value. Actual VFO waveform 1010 comprises a frequency 1020, and an amplitude ao at time $t_1$. In certain embodiments, frequency 920 equals frequency 1020.

Figure 12:
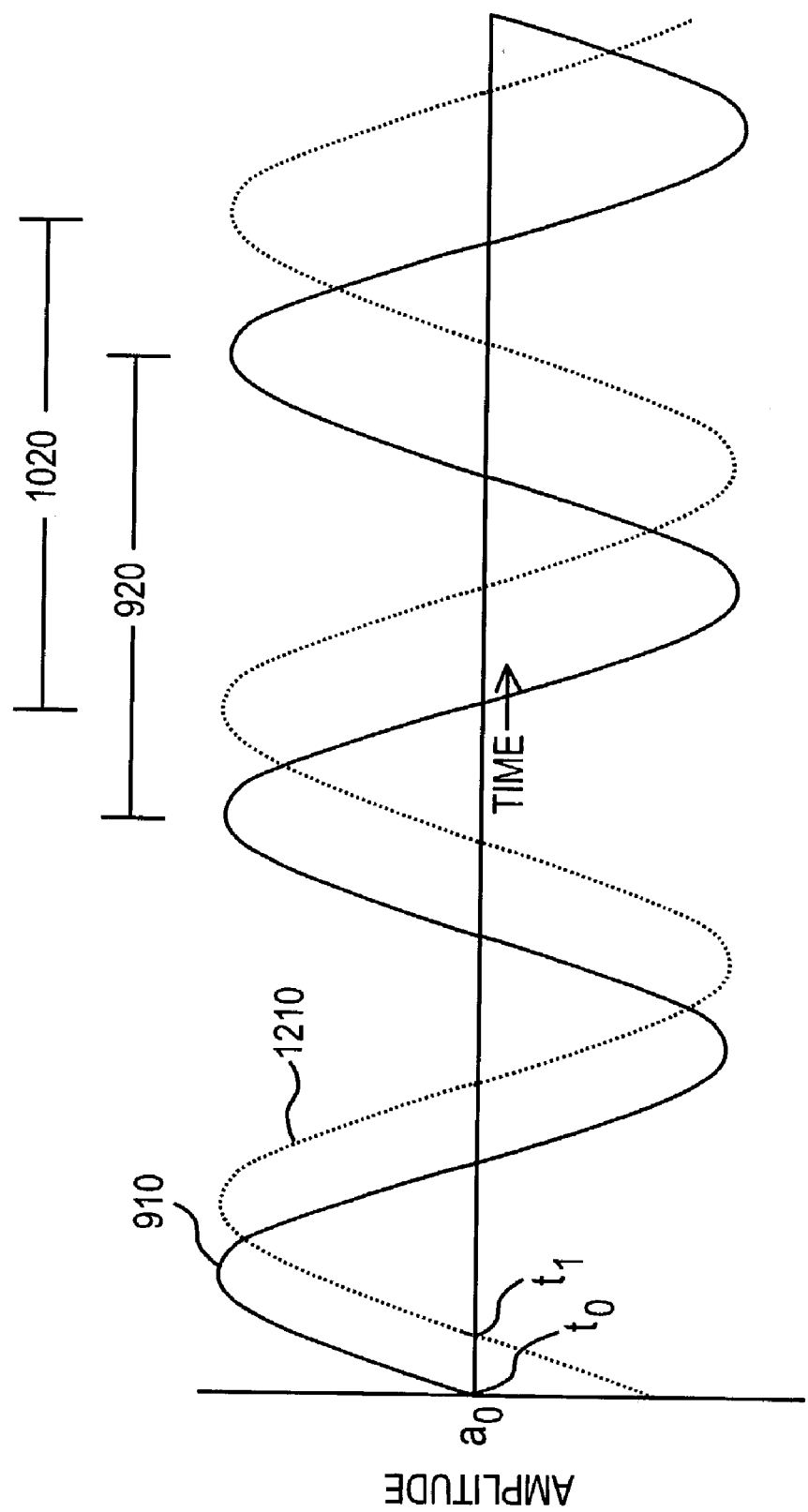
FIG. 12 shows the nominal VFO waveform of FIG. 9 and an actual VFO waveform, where those waveforms have differing frequencies and differing phases.

In other embodiments, frequencies 920 and 1020 differ. For example, and referring to FIG. 12, nominal VFO waveform 910 comprises frequency 920 and has amplitude $a_0$ at time $t_0$. Actual VFO waveform 1210 comprises frequency 1220 and has amplitude $a_0$ at time $t_1$. Using Applicants' apparatus and method, PLL circuit 465 (FIGS. 4, 5) can lock onto actual VFO waveform 1210 if frequency 920 differs from frequency 1220 by about twenty-five percent (25%) or less.

Figure 8:
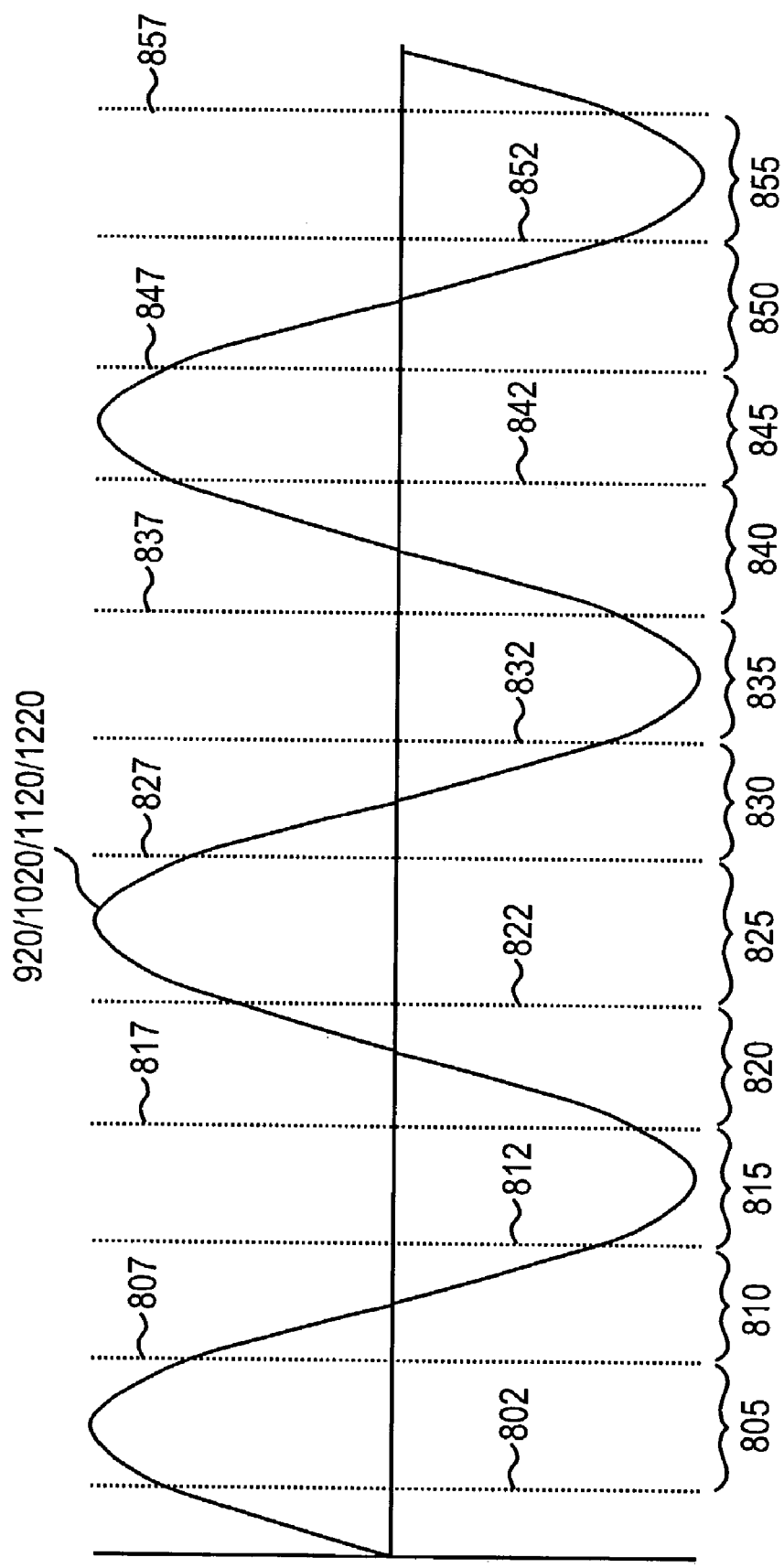
FIG. 8 shows a VFO waveform and a plurality of bit cell boundaries established using Applicants' apparatus and method.

Applicants' method transitions from step 1350 to step 1360 wherein Applicant's method defines a plurality of bit cell boundaries. For example and referring to FIG. 8, in step 1360 Applicants' method, using VFO waveform 910, or VFO waveform 1010, or VFO waveform 1110, or VFO waveform 1210, establishes bit cell boundaries 802, 807, 812, 817, 822, 827, 832, 837, 842, 847, 852, and 857. These bit cell boundaries define regions 805, 810, 815, 820, 825, 830, 835, 840, 845, 850, and 855, respectively. In certain embodiments, Applicants' method transition from step 1360 to step 1362 wherein Applicants' method determines if the running VFO samples of step 1344 is greater than or equal to the VFO acquisition length retrieved in step 1342. If Applicants' method determines in step 1362 that the running VFO samples of step 1344 is greater than or equal to the VFO acquisition length, then Applicants' method transitions from step 1362 to step 1370. Alternatively, if Applicants' method determines in step 1362 that the running VFO samples of step 1344 is not greater than or equal to the VFO acquisition length, then Applicants' method transitions from step 1362 to step 1340 and continues.

Applicants' method transitions from step 1360 to step 1370 wherein Applicants' method sets second system operating parameters. These second system operating parameters include, for example, a second gain level for gain module 445, a second PLL gain level, one or more error flags, and the like. In certain embodiments, the first gain level of step 1320 is greater than the second gain level of step 1370. In certain embodiments, the first gain level of step 1320 is less than the second gain level of step 1370. In certain embodiments, the first gain level of step 1320 substantially equals the second gain level of step 1370.

In certain embodiments, step 1370 is performed by a data storage device controller, such as a controller disposed in data storage device 130/140. In certain embodiments, step 1370 is performed by a controller, such as controller 160 (FIG. 1) disposed in Applicants' data storage and retrieval system, such as system 100 (FIG. 1).

Applicants' method transitions from step 1370 to step 1380 wherein Applicants' method initializes the read channel apparatus of step 1310 to use a PRML mode. In certain embodiments, step 1380 includes configuring an asynchronous read detect channel to include the architecture shown in FIG. 4. In certain embodiments, step 1380 further includes detecting the end of a VFO region, such as VFO region 730 (FIG. 7). In certain embodiments, step 1380 initializes the read channel apparatus of step 1310 to use a PRML mode after detecting a certain number of VFO region data bits.

In certain embodiments, step 1380 is performed by Applicants' data storage device, such as device 130/140. In certain embodiments, step 1380 is performed by a tape drive controller, such a tape drive controller 134 (FIG. 1)/144 (FIG. 1). In certain embodiments, Applicants' data storage device includes a device controller. In certain embodiments, that device controller includes program logic to perform step 1380. In certain embodiments, step 1380 is performed by Applicants' data storage and retrieval system, such as system 100. In certain embodiments, Applicants' data storage and retrieval system includes a controller, such as controller 160 (FIG. 1). In certain embodiments, that controller includes program logic to perform step 1380.

Applicants' method transitions from step 1380 to step 1390 wherein Applicants' method reads information from a tape storage medium using an asynchronous read detect channel having a PRML architecture. In certain embodiments, step 1390 includes using a read detect channel having the architecture shown in FIG. 4.

Applicants' invention includes an article of manufacture comprising a computer useable medium having computer readable program code disposed therein to method to read information from a tape storage medium using a read channel having a peak detection mode and a PRML mode. Applicants' invention further includes a computer program product usable with a programmable computer processor having computer readable program code embodied therein to method to read information from a tape storage medium using a read channel having a peak detection mode and a PRML mode. Such computer program products may be embodied as program code stored in one or more memory devices, such as a magnetic disk, a magnetic tape, or other non-volatile memory device.

In certain embodiments, individual steps recited in FIG. 13 may be combined, eliminated, or reordered.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to read information from a tape storage medium, wherein said tape storage medium comprises a calibration region and a data region, comprising the steps of:
   providing an asynchronous read channel capable of being configured in a first detection architecture or in a second detection architecture, wherein said read channel using said first detection architecture can read data written to said tape storage medium with a (1,7) modulation code, and wherein said read channel using said second detection architecture can read data written to said tape storage medium with a (0,k) modulation code;
   configuring said read channel to comprise said first detection architecture;
   forming a calibration waveform comprising information read from said calibration region using said first detection architecture;
   defining a plurality of bit cell boundaries;
   initializing said second detection architecture;
   reading information from said data region using said second detection architecture.

2. The method of claim 1, wherein said first detection architecture comprises a PLL circuit, further comprising the step of aligning said PLL circuit with said calibration waveform.

3. The method of claim 2, wherein said calibration region comprises a VFO region and wherein said calibration waveform comprises a VFO waveform, further comprising the steps of:
   establishing a nominal frequency for said VFO waveform;
   establishing a nominal phase for said VFO waveform;
   determining the actual frequency of said VFO waveform; and
   determining the actual phase of said VFO waveform.

4. The method of claim 1, further comprising the steps of:
   establishing a VFO acquisition length;
   determining the number of VFO samples read;
   determining if the number of VFO samples read is equal to or greater than the VFO acquisition length.

5. The method of claim 1, wherein said first detection architecture comprises:
- a peak detection channel;
- a mid-linear filter interconnected to said peak detection channel;
- a phase interpolator interconnected to peak detection channel;
- a sample interpolator interconnected to said mid-linear filter and to said phase interpolator;
- a gain control module interconnected to said sample interpolator; and
- a maximum likelihood detector interconnected to gain control module.

6. The method of claim 5, wherein said peak detection channel comprises:
- an equalizer, wherein said equalizer is interconnected to said mid-linear filter;
- a tracking threshold module interconnected to said equalizer;
- a peak detector interconnected to said tracking threshold module; and
- a PLL circuit interconnected to said phase interpolator.

7. The method of claim 1, wherein said second detection architecture comprises:
- an equalizer;
- a mid-linear filter interconnected to said equalizer;
- a phase interpolator;
- a sample interpolator interconnected to said mid-linear filter and to said phase interpolator;
- a gain control module interconnected to said sample interpolator;
- a maximum likelihood detector interconnected with to gain control module;
- a phase error generator interconnected to said gain control module;
- a PLL circuit interconnected to said phase error generator, wherein said PLL circuit is interconnected to said phase interpolator.

8. An article of manufacture comprising a computer useable medium having computer readable program code disposed therein to read information from a tape storage medium using an asynchronous read channel capable of being configured in a first detection architecture or in a second detection architecture, wherein said read channel using said first detection architecture can read data written to said tape storage medium with a (1,7) modulation code, and wherein said read channel using said second detection architecture can read data written to said tape storage medium with a (0,k) modulation code, wherein said tape storage medium comprises a calibration region and a data region, the computer readable program code comprising a series of computer readable program steps to effect:
- initializing said first detection architecture;
- forming a calibration waveform comprising information read from said calibration region using said first detection architecture;
- defining a plurality of bit cell boundaries;
- initializing said second detection architecture;
- reading information from said data region using said second detection architecture.

9. The article of manufacture of claim 8, wherein said first detection architecture comprises a PLL circuit, said computer readable program code further comprising a series of computer readable program steps to effect aligning said PLL circuit with said calibration waveform.

10. The article of manufacture of claim 9, wherein said calibration region comprises a VFO region and wherein said calibration waveform comprises a VFO waveform, said computer readable program code further comprising a series of computer readable program steps to effect:
- retrieving a nominal frequency for said VFO waveform;
- retrieving a nominal phase for said VFO waveform;
- determining the actual frequency of said VFO waveform; and
- determining the actual phase of said VFO waveform.

11. The article of manufacture of claim 10, said computer readable program code further comprising a series of computer readable program steps to effect:
- retrieving a VFO acquisition length;
- determining the number of VFO samples read;
- determining if the number of VFO samples read is equal to or greater than the VFO acquisition length.

12. A computer program product usable with a programmable computer processor having computer readable program code embodied therein to read information from a tape storage medium using an asynchronous read channel capable of being configured in a first detection architecture or in a second detection architecture, wherein said read channel using said first detection architecture can read data written to said tape storage medium with a (1,7) modulation code, and wherein said read channel using said second detection architecture can read data written to said tape storage medium with a (0,k) modulation code, wherein said tape storage medium comprises a calibration region and a data region, comprising:
- computer readable program code which causes said programmable computer processor to configure said read channel to comprise said first detection architecture;
- computer readable program code which causes said programmable computer processor to form a calibration waveform comprising information read from said calibration region using said first detection architecture;
- computer readable program code which causes said programmable computer processor to define a plurality of bit cell boundaries;
- computer readable program code which causes said programmable computer processor to configure said read channel to comprise said second detection architecture;
- computer readable program code which causes said programmable computer processor to read information from said data region using said second detection architecture.

13. The computer program product of claim 12, wherein said first detection architecture comprises a PLL circuit, further comprising computer readable program code which causes said programmable computer processor to align said PLL circuit with said calibration waveform.

14. The computer program product of claim 13, wherein said calibration region comprises a VFO region and wherein said calibration waveform comprises a VFO waveform, further comprising:
- computer readable program code which causes said programmable computer processor to retrieve a nominal frequency for said VFO waveform;
- computer readable program code which causes said programmable computer processor to retrieve a nominal phase for said VFO waveform;
- computer readable program code which causes said programmable computer processor to determine the actual frequency of said VFO waveform; and
- computer readable program code which causes said programmable computer processor to determine the actual phase of said VFO waveform.

15. The computer program product of claim 14, further comprising:
- computer readable program code which causes said programmable computer processor to retrieve a VFO acquisition length;
- computer readable program code which causes said programmable computer processor to determine the number VFO samples read;
- computer readable program code which causes said programmable computer processor to determine if the number of VFO samples read is equal to or greater than the VFO acquisition length.

* * * * *